(12) United States Patent
Minola

(10) Patent No.: US 8,978,849 B2
(45) Date of Patent: Mar. 17, 2015

(54) DEVICE FOR DAMPING AND MECHANICAL DISSIPATION OF DYNAMIC DISTURBANCES TRANSMITTED BETWEEN TWO BODIES, GENERATED BY FORCING ELEMENTS OF A DYNAMIC, SEISMIC NATURE AND BY WAVE-MOTION IN GENERAL STRUCTURES

(75) Inventor: Paolo Minola, Milan (IT)

(73) Assignee: Saipem S.p.A., San Donato Milanese (IT)

( * ) Notice: Subject to any disclaimer, the term of this patent is extended or adjusted under 35 U.S.C. 154(b) by 731 days.

(21) Appl. No.: 12/996,043

(22) PCT Filed: May 28, 2009

(86) PCT No.: PCT/EP2009/003849
§ 371 (c)(1),
(2), (4) Date: Mar. 8, 2011

(87) PCT Pub. No.: WO2009/146853
PCT Pub. Date: Dec. 10, 2009

(65) Prior Publication Data
US 2011/0148016 A1 Jun. 23, 2011

(30) Foreign Application Priority Data
Jun. 6, 2008 (IT) .............................. MI2008A1037

(51) Int. Cl.
*F16F 9/30* (2006.01)
*F16F 3/087* (2006.01)
*F16F 15/08* (2006.01)

(52) U.S. Cl.
CPC ............... *F16F 3/0873* (2013.01); *F16F 15/08* (2013.01)
USPC ............................ 188/379; 52/167.4; 248/550

(58) Field of Classification Search
USPC ......... 248/562, 569, 580–584, 589, 592, 599, 248/600; 52/167.1–167.8; 267/136; 188/378–380

See application file for complete search history.

(56) References Cited

U.S. PATENT DOCUMENTS

| 3,434,708 | A | 3/1969 | Hawk, Jr. |
| 4,496,130 | A | 1/1985 | Toyama |
| 6,021,992 | A | 2/2000 | Yen et al. |

(Continued)

FOREIGN PATENT DOCUMENTS

| EP | 0 072 869 | 3/1983 |
| EP | 1 674 777 | 6/2006 |

(Continued)

OTHER PUBLICATIONS

International Search Report Issued Sep. 21, 2009 in PCT/EP09/003849 filed May 28, 2009.

*Primary Examiner* — Christopher Schwartz
(74) *Attorney, Agent, or Firm* — Oblon, McClelland, Maier & Neustadt, L.L.P.

(57) ABSTRACT

The present invention relates to a damping and dissipation device (10) which can be used for limiting disturbances transmitted between two bodies, generated by forcing elements of a dynamic, seismic nature and by wave-motion in structures in general, which comprises two end elements (18, 14, 32) each destined for being respectively connected to one of the two bodies, the device (10) also comprising at least one disk (11) made of an elastomeric material and at least one elastic element (12) with a variable load, coaxially arranged along an axis A, the elastic element (12) with a variable load having an initial pre-compression degree and is characterized in that at least one of the end elements (18) is connected to the device (10) through a sliding coupling with a sliding direction within a plane tilted with respect to the axis (A), preferably by at least 60°.

17 Claims, 7 Drawing Sheets

(56) References Cited

U.S. PATENT DOCUMENTS

| | | | |
|---|---|---|---|
| 6,045,328 A * | 4/2000 | Jones | 416/140 |
| 6,126,136 A | 10/2000 | Yen et al. | |
| 6,324,795 B1 * | 12/2001 | Stiles et al. | 52/167.4 |
| 7,237,364 B2 * | 7/2007 | Tsai | 52/167.6 |
| 7,971,692 B2 * | 7/2011 | Gebelin | 188/378 |
| 8,033,367 B2 | 10/2011 | Minola | |
| 2007/0125930 A1 * | 6/2007 | Tsai | 248/580 |

FOREIGN PATENT DOCUMENTS

| | | |
|---|---|---|
| IT | MI20061267 A1 | 1/2008 |
| WO | 2008 049836 | 5/2008 |

* cited by examiner

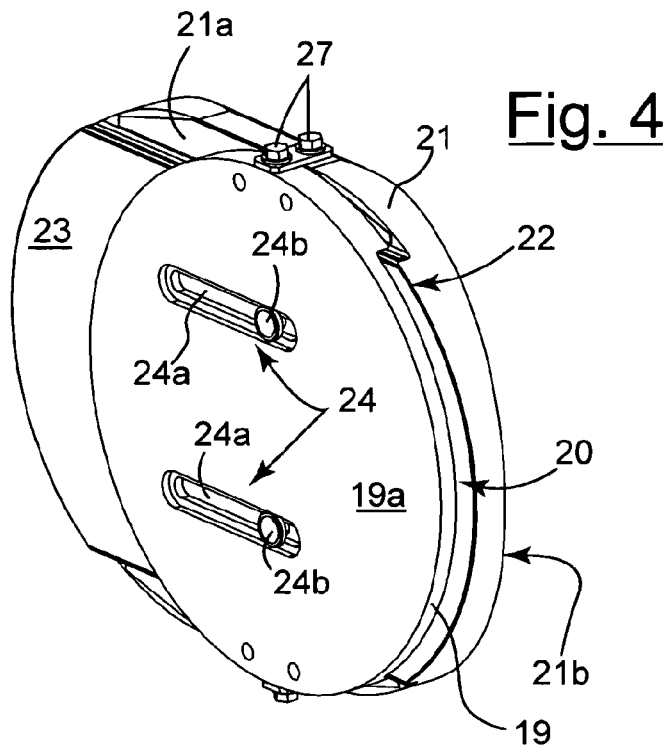
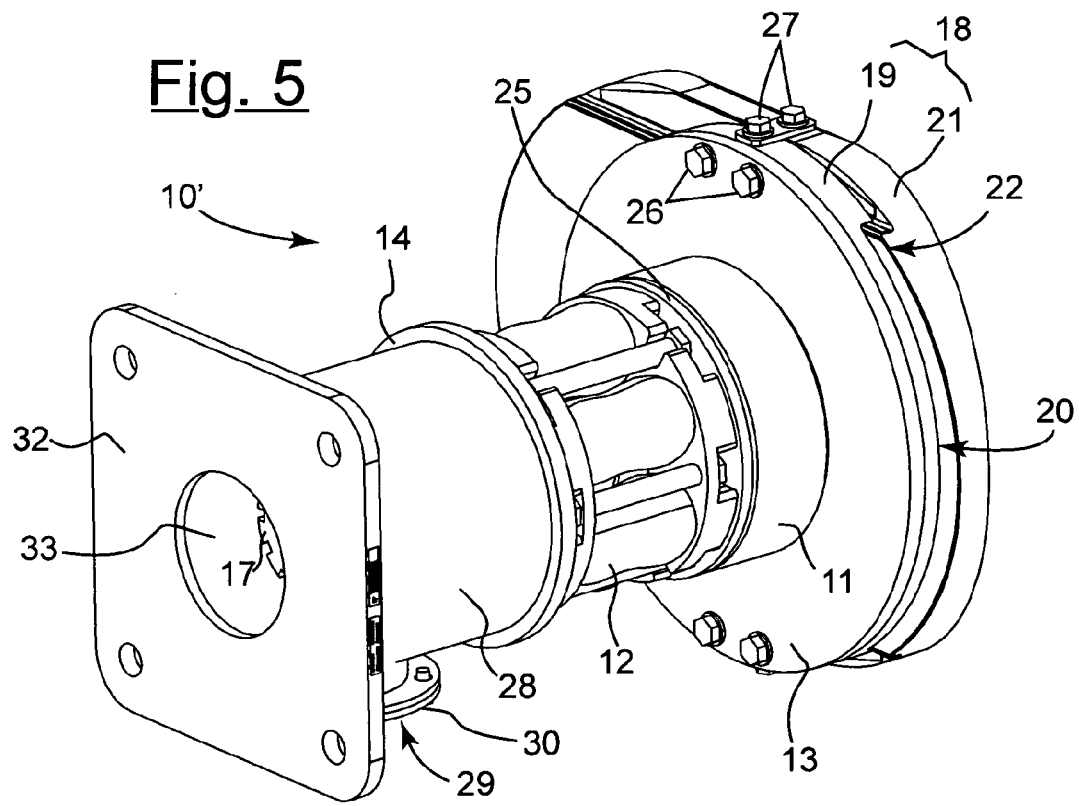

DEVICE FOR DAMPING AND MECHANICAL DISSIPATION OF DYNAMIC DISTURBANCES TRANSMITTED BETWEEN TWO BODIES, GENERATED BY FORCING ELEMENTS OF A DYNAMIC, SEISMIC NATURE AND BY WAVE-MOTION IN GENERAL STRUCTURES

CROSS-REFERENCE TO RELATED APPLICATIONS

This application is the National Stage of and claims the benefit of domestic priority to International Patent Application No. PCT/EP09/003849, filed on May 28, 2009, and claims the benefit of foreign priority to Italian Patent Application No. MI2008A001037, filed on Jun. 6, 2008.

BACKGROUND OF THE INVENTION

I. Field of the Invention

The present invention relates to a damping and dissipation device which can be used for limiting disturbances transmitted between two bodies, generated by forcing elements of a dynamic nature in structures in general. Forcing elements of a dynamic nature refer in particular to forcing elements of an impulsive, vibratory, seismic type and/or deriving from wave-motion.

II. Description of Related Art

Within the range of damping and dissipation devices of disturbances of a dynamic nature, the device object of Italian patent application n. MI2006A001267 owned by the Applicant, is at present known in particular, which has proved to be capable of effectively damping disturbances of a dynamic nature which develop along a pre-determined damping direction and which is used for example for damping disturbances along the axis of structures with an axial development, such as pipelines, tanks, pillars, beams and so forth.

This device comprises two blocks made of elastomeric material between which a pre-compressed elastic element preferably of the variable load type, is interposed, for example such as that object of Italian patent application n. MI2004A002444 of the same Applicant.

The unit consisting of two blocks made of elastomeric material and the interposed elastic element is assembled between two containment plates destined for being constrained to the structure having an axial development and a fixed supporting body, respectively.

These plates are initially clamped in a reciprocal fixed position determined by the tightening of two legs sliding inside each other, each respectively fixed to one of the two plates. Once the device is functioning, this fixed coupling is released by means of an unblocking interface accessible from the free end of the outer leg.

The known damping device of dynamic disturbances can be effectively used, for example, in the case of instabilities of the fluid-dynamic type which are the cause of impulsive axial movements, such as for example water-hammer or the slug motion of a fluid.

Analogously, this known device also offers an effective damping of axial disturbances of a dynamic nature caused by start-up transients of plants, instantaneous mechanism interventions, such as for example the opening of safety valves, or excessive reactions of a thermal nature on structures.

In these applications, two damping devices of the known type are arranged parallel to the structure having an axial development and preferably in axis between each other, so that a first of the above plates of each device is constrained to a framework integral with the structure and the second plate is constrained to a central supporting body integral with the ground.

In this way, in the case of an impulsive dynamic disturbance, indifferently in one of the two directions along the axis of the structure, the disturbance is transferred to the damping device which, as it is compressed against the fixed support, is capable of attenuating the load peak to which the structure is subjected.

In this type of application, where the structure substantially only undergoes disturbances of a dynamic nature along its own axis, the known damping device of dynamic disturbances offers optimum results.

This device, on the contrary, cannot be applied if the structure is contemporaneously subjected to both axial and transversal disturbances with respect to its axis, as, in the case of transversal disturbances, a rigid constraint to the structure and supporting body would cause the breakage or irremediable damage of the damping device itself.

Furthermore, in the known damping device it is not always easy to effect the initial releasing of the two plates, in particular in the case of assembly in which the respective release interface is not easily accessible. This occurs for example when the known damping device is assembled at considerable heights and with the main damping direction coinciding with a direction orthogonal to the axis of the structure.

BRIEF SUMMARY OF THE INVENTION

An objective of the present invention is to overcome the drawbacks mentioned above and in particular to provide a damping and dissipation device of dynamic disturbances which can also be effectively used in structures contemporaneously subject to both disturbances along the main damping direction of the device, and also to those caused by transversal dynamic forcing elements with respect to said direction.

A further objective of the present invention is to provide a damping and dissipation device of dynamic disturbances whose set-up can be effected rapidly and without the necessity of an intervention on the part of qualified staff.

Another objective of the present invention is to conceive a damping and dissipation device which can be easily installed, regardless of the particular assembly of the device with respect to the structure.

Yet another objective of the present invention is to provide a damping and dissipation device of dynamic disturbances which is capable of effectively contrasting not only dynamic effects of an impulsive nature, but also of a seismic and/or vibratory nature and also deriving from wave-motion.

These and other objectives according to the present invention are achieved by providing a damping and dissipation device of dynamic disturbances as specified in claim 1.

Further characteristics of the damping and dissipation device of dynamic disturbances are object of the dependent claims.

BRIEF DESCRIPTION OF THE SEVERAL VIEWS OF THE DRAWINGS

The characteristics and advantages of a damping and dissipation device of dynamic disturbances according to the present invention will appear more evident from the following illustrative and non-limiting description, referring to the enclosed schematic drawings, in which:

FIG. 4 is an axonometric view of the coupling interface of a structure of the damping and dissipation device of dynamic disturbances according to the present invention;

FIG. 5 is an axonometric view of a second embodiment of the damping and dissipation device of dynamic disturbances according to the present invention;

DETAILED DESCRIPTION OF THE INVENTION

Figure 1:
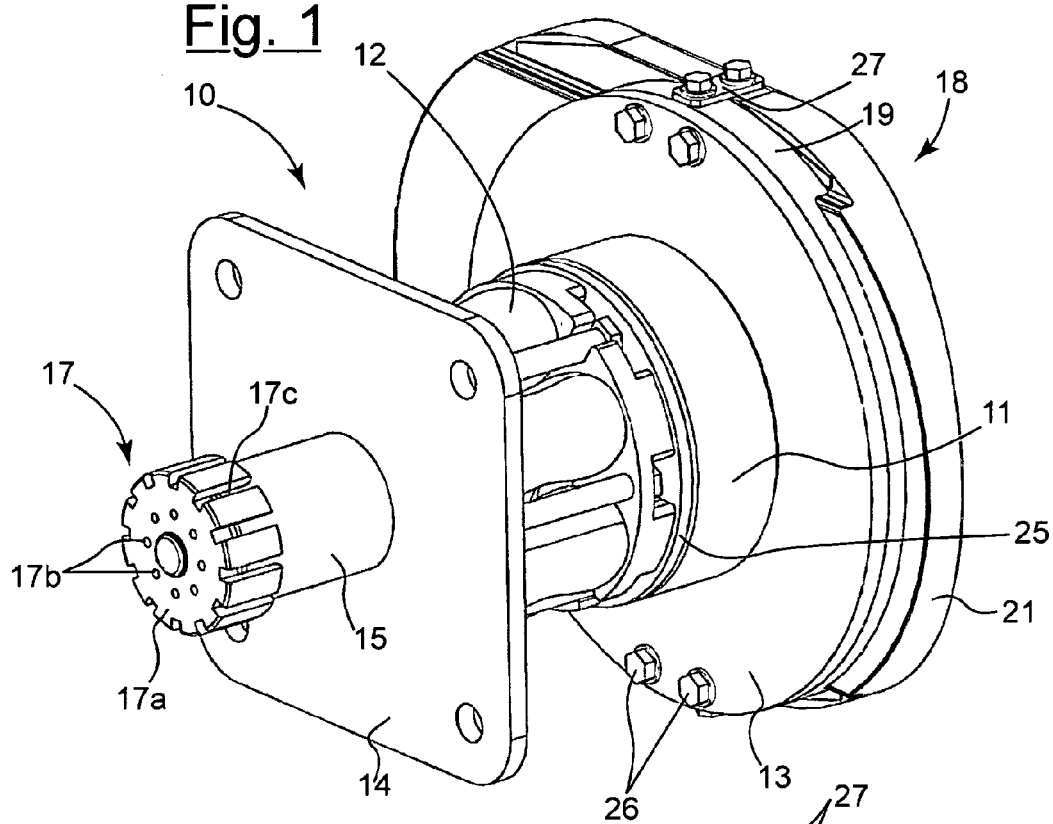
FIG. 1 is an axonometric view of a first embodiment of the damping and dissipation device of dynamic disturbances according to the present invention.
Figure 2:
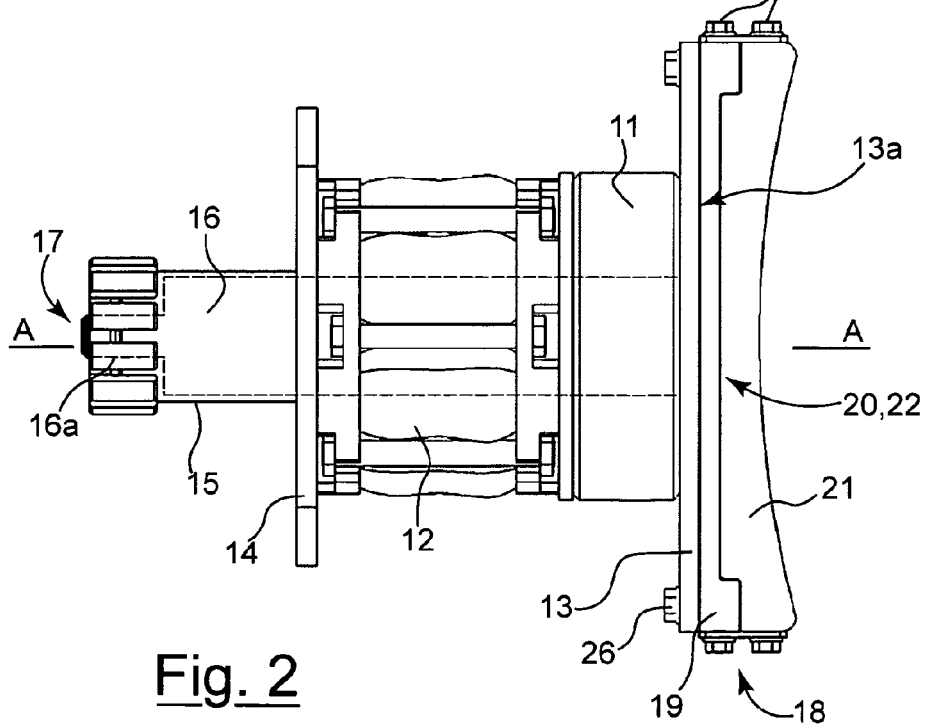
FIG. 2 is a raised side view of the damping and dissipation device of dynamic disturbances of FIG. 1.
Figure 3:
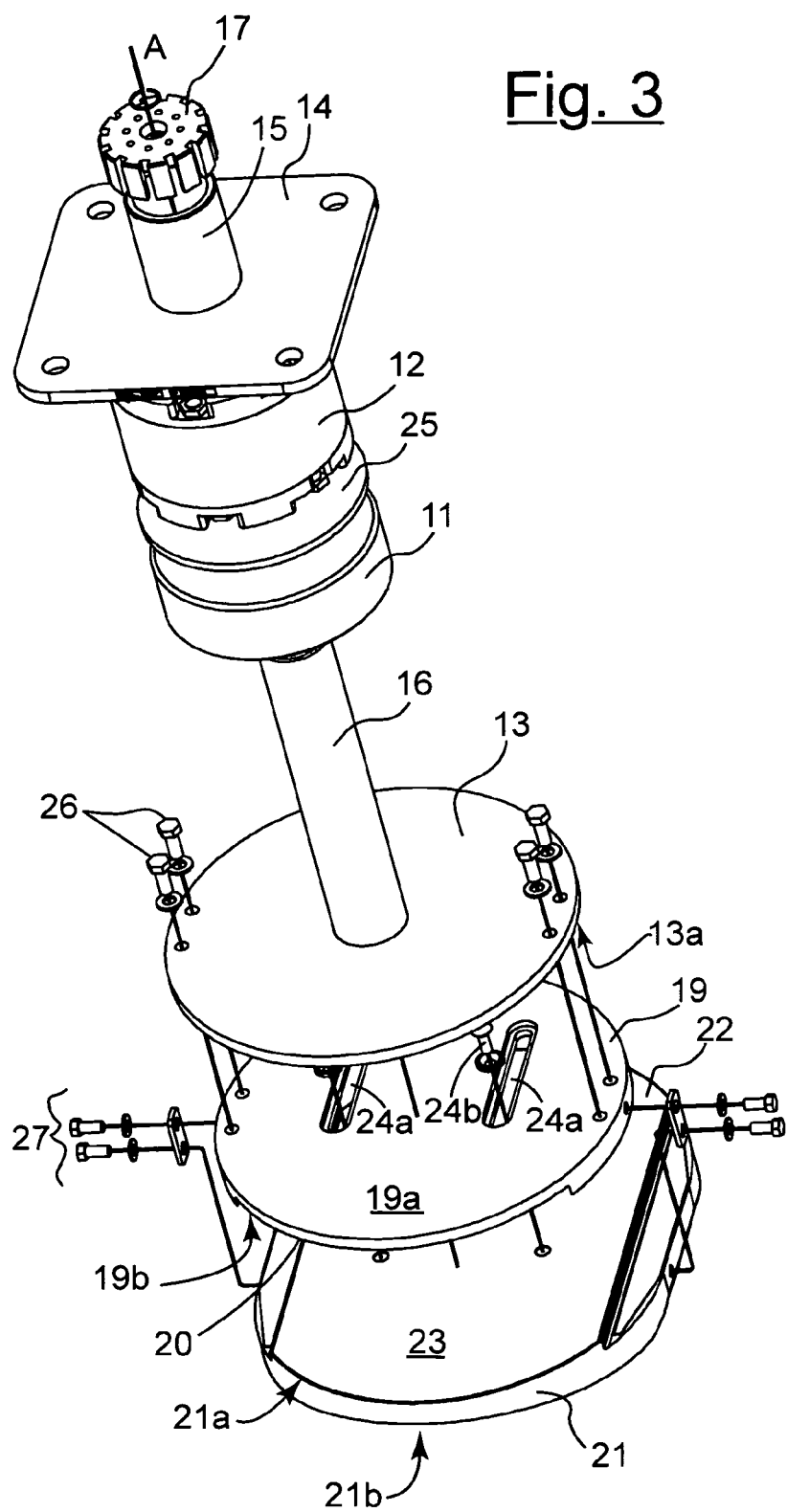
FIG. 3 is an exploded view of the damping and dissipation device of dynamic disturbances of FIG. 1.

With reference to FIGS. 1-3, these show a damping and dissipation device of dynamic disturbances transmitted between two bodies 100, 110, indicated as a whole with 10. The two bodies between which the dynamic disturbances are transmitted can, for example, be a structure 100 preferably with an axial development and a supporting body 110 integral with the ground.

The damping and dissipation device of dynamic disturbances 10 comprises at least one disk 11 made of an elastomeric material and at least one elastic element 12 with a variable load arranged coaxially between each other along an axis A and interposed between two end elements 18, 14 each destined for being constrained to one of the two bodies 100, 110.

The elastic element 12 with a variable load, preferably produced according to what is described in Italian patent application n. MI2004A002444, has an initial pre-compression degree.

This pre-compression degree is determined according to the project requirements on the basis of the load curve to which the structure 100 is subjected in addition to the hysteresis cycle necessary for at least partly dissipating the energy of the dynamic disturbances. The pre-compression degree of the elastic element with a variable load 12 is established in the assembly phase in the workshop thus making a regulation during the installation phase on site superfluous.

In the preferred embodiment in which the elastic element 12 is of the type described in Italian patent application n. MI2004A002444, the pre-compression is obtained through the removal of specific plugs.

In order to avoid damaging the disk 11 made of an elastomeric material due to the presence of irregularity on the contact surface of the elastic element 12 with a variable load, a rigid protection sheath 25 is preferably interposed between the two elements 11, 12.

The disk 11 made of an elastomeric material and the elastic element 12 with a variable load are preferably situated between two containment plates 13, 14 each provided with a leg 15, 16 in which a first plate 14 forms one of the two end elements, preferably that destined for being connected to the support 110.

The device 10 is initially provided with the two plates 13, 14 clamped in a reciprocal fixed position. For this purpose, the leg 16 of a first plate 13 crosses the leg 15 of a second plate 14 and can be clamped in a reciprocal fixed position with respect to the same 15.

To allow the release of the initial reciprocal constraint between the two plates 13, 14, a suitable nut 17 is foreseen at the free end of the two legs 15, 16.

Said nut 17 is advantageously produced in the form of a ferrule 17a equipped with an internal threading (not illustrated) which cooperates with the free end 16a of the internal leg 16 which has a complementary threading on the outside (not shown). The internal leg 16 is also provided with a known blocking ring (not shown) suitable for preventing the nut 17 from being unthreaded from the leg 16 in the case of excessive unscrewing.

According to the present invention, the second end element is a sliding block 18 suitable for allowing sliding on a plane tilted generally by at least 60°, with respect to the axis A. The sliding plane of the sliding block 18 is preferably tilted by 90° with respect to the axis A.

The sliding block 18 comprises a sliding guide 19 which is preferably disk-shaped and made of a material with a low friction coefficient, such as bronze, in order to facilitate sliding on the same.

Said sliding guide 19 comprises a first flat side 19a for the fixed coupling with the free surface 13a of the first containment plate 13 by means of specific clamping means 26 so that it is orthogonal to the axis A, and a second side 19b whose inclination with respect to the first side 19a creates the sliding plane of the sliding block 18.

Depending on the particular applicative requirements, the second side 19b of the sliding guide 19 can be parallel or tilted with respect to the first side 19a.

The second side 19b of the sliding guide 19 is preferably conformed so as to form a linear sliding guide 20 for a slide 21. For this purpose, the second side 19b of the sliding guide 19 has at least one cavity 20 which receives a complementary portion 22 of the slide 21. The slide 21 also preferably has a substantially discoidal conformation, in which the complementary portion 22 is situated on a first side 21a, which slides into the at least one cavity 20 of the sliding guide 19, and on a second side 21b, there is a rest surface for the second body 100 to which the damping and dissipation device 10 must be connected, and preferably for the structure 100.

The slide 21 is made of a material having a high friction coefficient and preferably extremely resistant to wear in order to provide the structure 100 with a stable coupling.

The rest surface 21b for the structure 100 is preferably coated with a gripping paint, resistant to high temperatures.

In order to guarantee a substantially frictionless sliding between the second side 19b of the sliding guide 19 and the first side 21a of the slide 21, the portion 22 of said side 21a complementary to the cavity 20 of the guide 19 is covered with a lamina 23 made of a material having a low friction coefficient, such as stainless steel.

For reasons of safety, it is also appropriate to limit the relative sliding between the sliding guide 19 and the slide 21 of the sliding block 18. For this purpose, run-limit means 24 are envisaged, preferably produced by means of at least one loop 24a present in the sliding guide 19 in which at least one pin 24b constrained to the slide 21 is compelled to run. The pin 24b is produced from the head of means envisaged for the reciprocal tightening between the slide 21 and the coating lamina 23.

In the initial configuration of the damping and dissipation device of dynamic disturbances 10 according to the present invention, the guide 19 and slide 21 of the sliding block 18 are constrained to each other by means of specific constraining means 27 which are removed once the device 10 has been installed.

According to an advantageous embodiment, the release nut 17 of the two plates 13, 14 has gripping means 17b, 17c, both in the front and laterally.

Depending on the possibility of access to the damping and dissipation device 10, this makes it possible to act on the nut 17 both axially and laterally to bring it in rotation using specific instruments. In front of the nut 17 there is for example a plurality of cavities 17b suitable for cooperating with the interface of a first specific instrument, whereas laterally there are preferably grooves 17c suitable for cooperating with the interface of a second different instrument.

Figure 6:
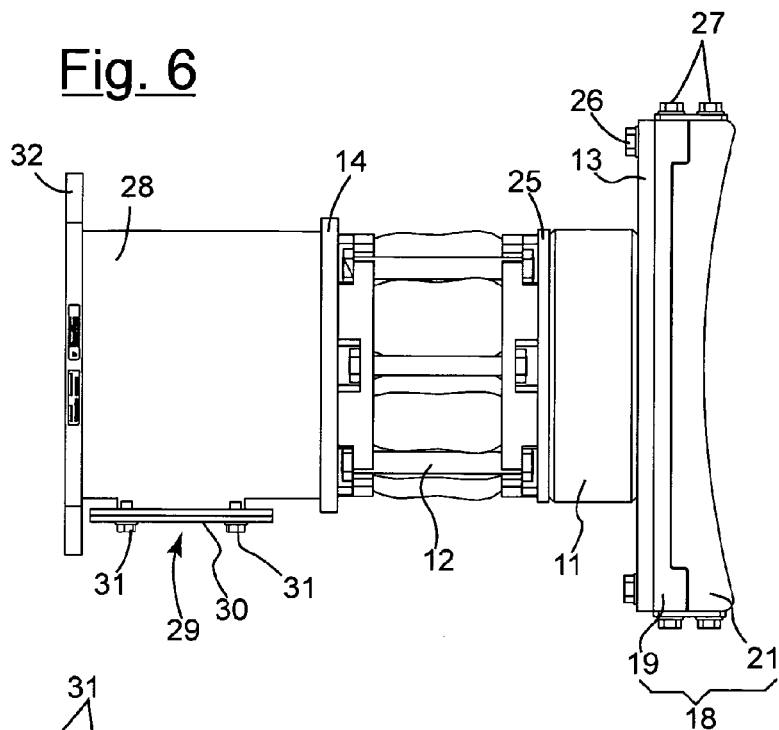
FIG. 6 is a raised side view of the damping and dissipation device of dynamic disturbances of FIG. 5.
Figure 7:
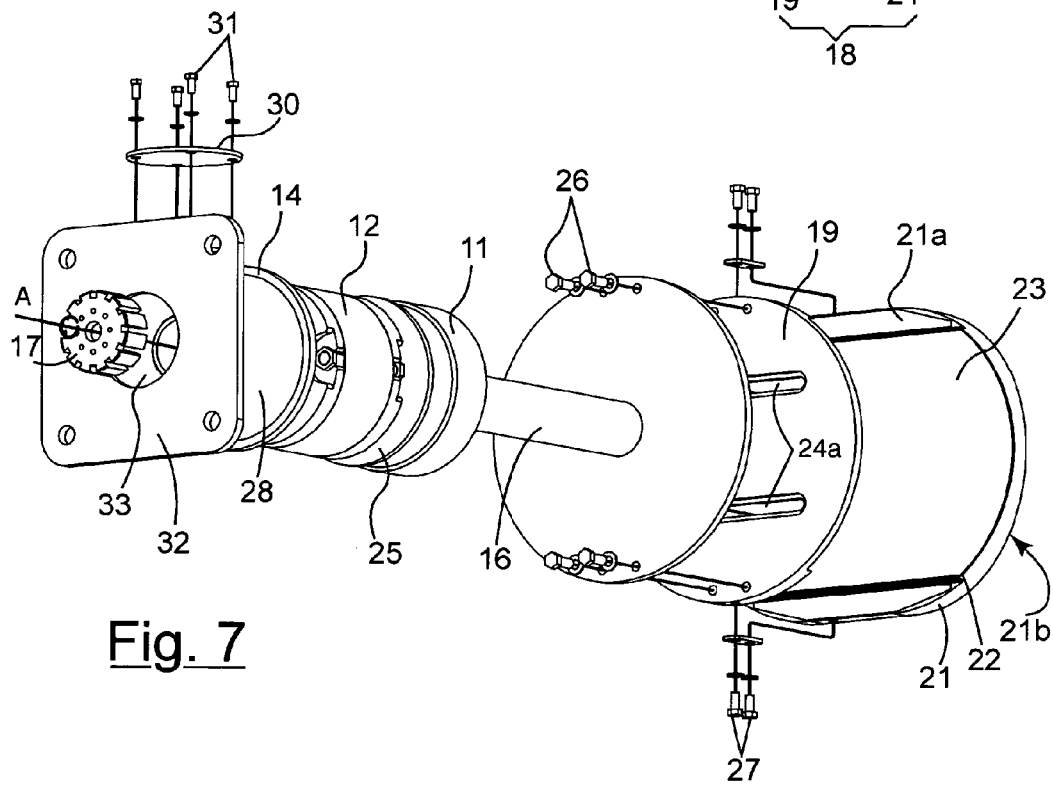
FIG. 7 is an exploded view of the damping and dissipation device of dynamic disturbances of FIG. 5.

In the preferred embodiment of the damping and dissipation device 10' illustrated in FIGS. 5-7, the release nut 17 of the two plates 13, 14 is preferably housed in a hollow cylindrical body 28 connected below to the second containment plate 14 which protects the nut 17 from external agents thus keeping its functionality unaltered.

In order to allow access to the nut 17, the hollow cylindrical body 28 is equipped with a closable access window 29.

For the closing of the window 29, it is possible to use a covering disk 30 which can be tightened around the window by means of a plurality of clamping means 31 such as screws, for example.

Finally, the hollow cylindrical body 28 is partially closed above by means of a coupling plate 32 which, in this embodiment, forms the end element of the damping and dissipation device 10' destined for being connected to the support 110. Said plate 32 has a central hole 33 to maintain axial access to the nut 17.

The damping and dissipation device 10, 10' can be easily adapted to the particular installation requirements using a sliding block 18 which forms the plane and most suitable sliding direction for the particular application. Furthermore, if necessary, the regulation of the damping and dissipation device 10, 10' can also be effected on site during the installation phase through the simple addition of thickening plates (not shown).

Figure 8:
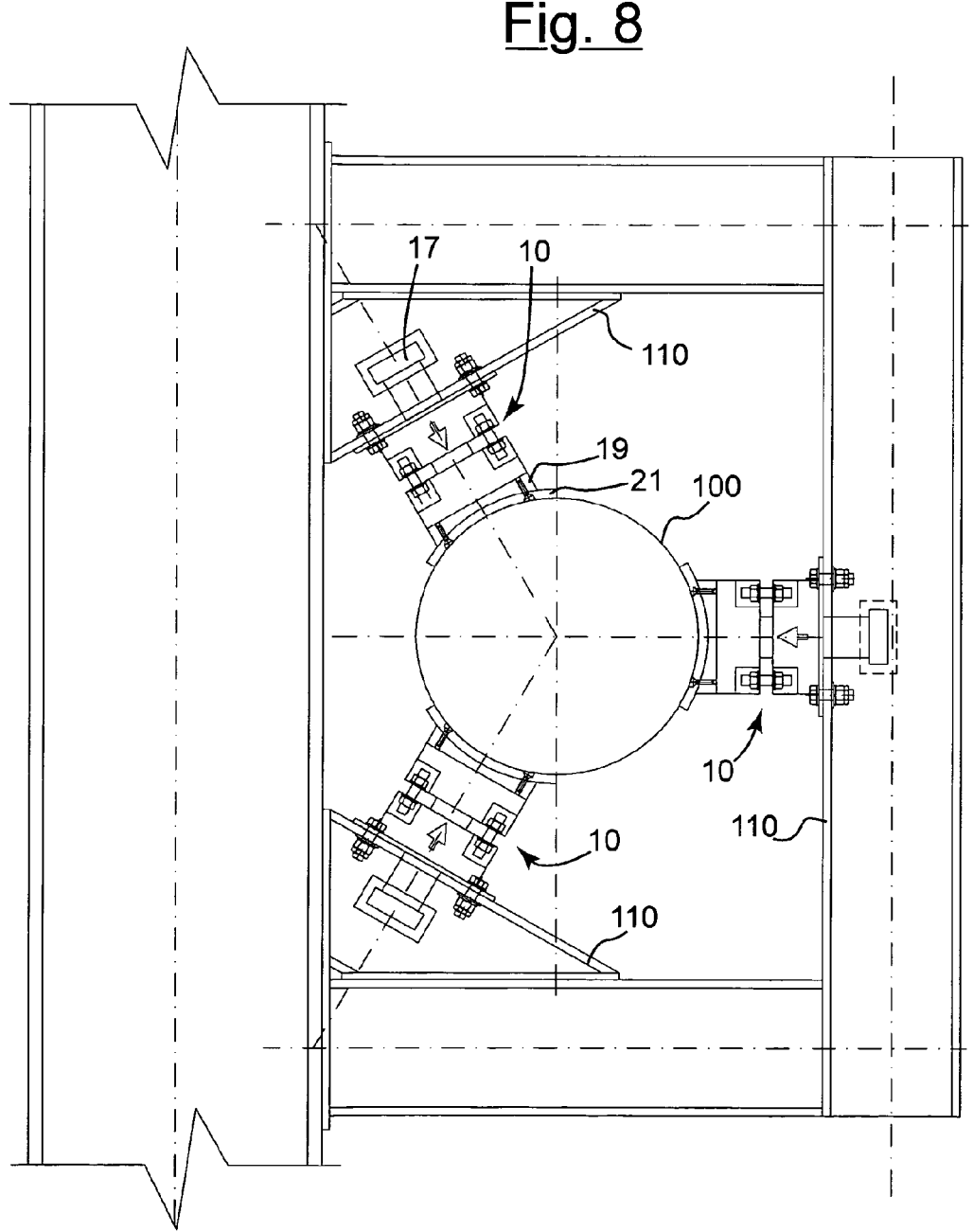
FIG. 8 illustrates a first application of the damping and dissipation device of dynamic disturbances according to the present invention.
Figure 9:
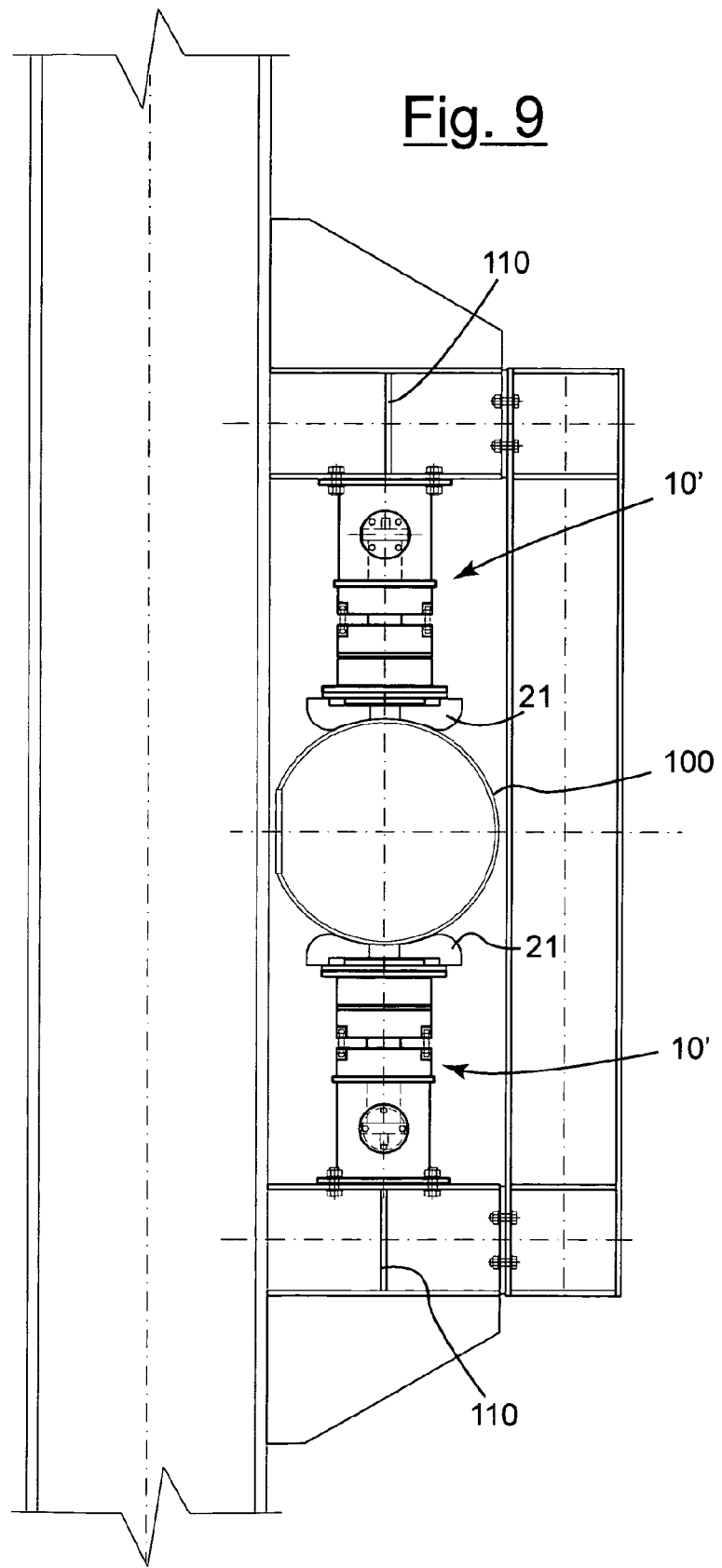
FIG. 9 illustrates a second application of the damping and dissipation device of dynamic disturbances according to the present invention.

The damping and dissipation device of dynamic disturbances 10, 10' according to the present invention can be applied to a structure 100 such as that illustrated, for example, in FIGS. 8 and 9.

In the installation represented in FIG. 8, three devices 10 according to the first preferred embodiment of the invention are arranged at 120° around the structure 100 and constrained to a support 110 integral to the ground.

Said arrangement of the devices 10 causes the damping of the dynamic disturbances which the structure 100 undergoes in the plane orthogonal to its axis B.

In the case of acoustic fatigue for example, this configuration allows the surplus energy transmitted to the structure 100 to be dissipated.

Analogously, the same configuration can be used for the dissipation of energy deriving from wave-motion in order to reduce the fatigue to which structures present on boats are subjected.

The damping and dissipation devices 10 of dynamic disturbances used comprise a sliding block 18 with a sliding plane orthogonal to the axis of the device 10 and produced so as to have the sliding guide 19 parallel to the axis B of the structure 100 and the slide 21 having a coupling side 21b with a conformation complementary to a portion of the cylindrical surface of the structure 100. This allows the structure to translate along its axis B by the sliding of the slide 21, for example following heat dilation, within a certain limit defined by the run-limit means 24.

Analogously, in the installation represented in FIG. 9, two devices 10' according to the second preferred embodiment of the invention are arranged around the structure 100 coaxially to each other and so as to exert an opposing action, and constrained to a support 110 integral with the ground.

In this configuration, the devices 10' are capable of damping possible excessive vibrations produced for example during the start-up phases of plants.

The damping and dissipation devices 10' of dynamic disturbances used in this application comprise a sliding block 18 with a sliding plane orthogonal to the axis of the device 10' and produced so as to have a sliding guide 19 orthogonal to the axis B of the structure and a slide 21 having a coupling side 21b with a conformation complementary to a portion of the cylindrical surface of the structure 100. This allows the structure to oscillate, by the sliding of the slide 21, orthogonally to its axis B, as illustrated by the arrow of FIG. 9, within a certain limit defined by the run-limit means 24.

Furthermore, the release of the containment plates 13, 14 in the installation phase can be effected laterally through the window 29 which allows an easy but protected access to the nut 17.

Figure 10:
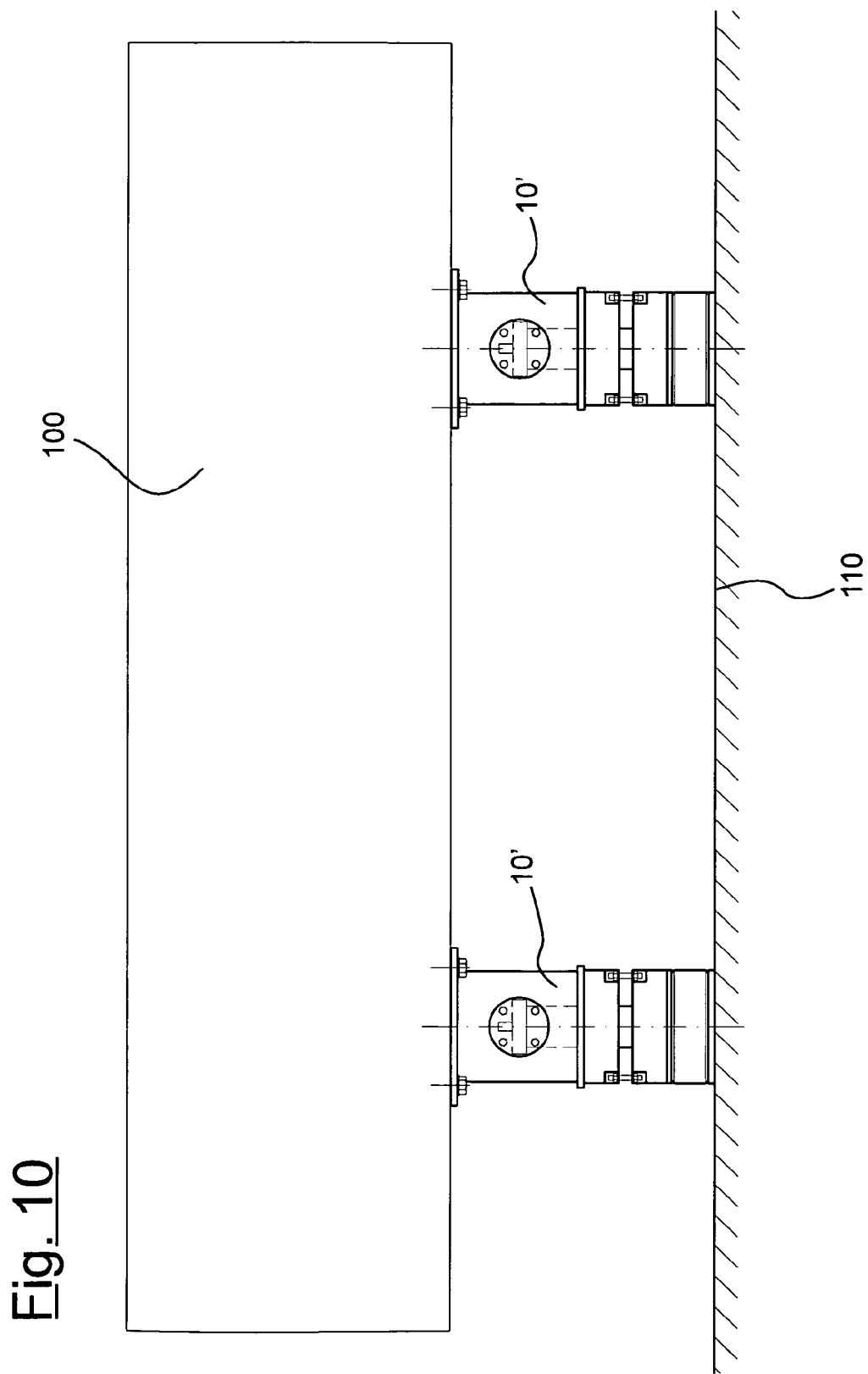
FIG. 10 illustrates a third application of the damping and dissipation device of dynamic disturbances according to the present invention.

FIG. 10 shows a further application of the damping and dissipation device 10, 10' according to the present invention in which a rotating machine 100, such as a compressor, for example, can be isolated from the foundations 110 so as not to transmit the vibrations induced during the operative phase to the surrounding area. For this purpose, the rotating machine 100 is connected to the foundations 110 by means of at least two devices 10, 10' according to the present invention as illustrated in the figure. In an analogous configuration, in which there is a mass 100 instead of the rotating machine, the damping and dissipation devices of dynamic disturbances 10, 10' are also capable of decoupling the supporting foundations 110 from the mass 100, isolating it from the seism through the damping and attenuation of the dynamic phenomenon transmitted by the earth itself.

The characteristics of the device, object of the present invention, as also the relative advantages, are evident from the above description:

Damping and reduction of the dynamic effects of an impulsive, seismic, vibratory nature, caused by acoustic fatigue or deriving from wave-motion;

Isolation of a rotating machine from the foundations, preventing the vibrations induced from being transmitted through the foundations to the surrounding area;

Isolation of a structure from the seism; the dynamic phenomenon transmitted from the ground to the structure is damped and attenuated;

zeroing of gaps; the adjustable pre-compression of the damping and dissipation device 10, 10' annuls any possible gaps between the device 10, 10' and the structure 100, which can arise from assembly or production inaccuracies. These gaps can be extremely harmful in the case of phenomena of a dynamic nature, whether they be impulsive or vibratory;

Optimization of the performance of the damping and dissipation device 10, 10'. The cold pre-compression of the elastomer disk 11 induced by the pre-compressed elastic element 12 allows the damping and dissipation device 10, 10' to be activated as soon as the unstabling event begins, avoiding the first ineffective part of the curve characteristic of the material;

Facilitated assembly and regulation of the pre-compression degree;

Rapid and simple set-up as there is no need for a regulation on site which would require the intervention of qualified operators;

No welding on site. The damping and dissipation device 10, 10' is bolted to the support 110 and coupled with the structure 100; neither welding onto the support 110 nor onto the existed structure 100 is required;

Easy inspection and maintenance with the dismantling of the bolts only;

Interchangeability of the single components;

Constant encumbrance dimensions regardless of the pre-compression and damping curve;

Reduced encumbrance in the transporting phase of the single damping devices 10, 10'.

Finally, the device conceived can obviously undergo numerous modifications and variants, all included in the invention; furthermore all the details can be substituted by technically equivalent elements. In practice, the materials used, as also the dimensions, can vary according to technical requirements.

The invention claimed is:

1. A damping and dissipation device of dynamic disturbances transmitted between two bodies, comprising:
   two end elements each configured to be respectively connected to one of the two bodies; and
   at least one disk made of an elastomeric material and at least one elastic element with a variable load positioned coaxially with respect to each other along an axis, said elastic element with a variable load having an initial pre-compression degree, wherein
   at least one of said two end elements is connected to the device through a sliding coupling with a sliding direction within a plane tilted with respect to said axis.

2. The damping and dissipation device of dynamic disturbances according to claim 1, wherein said sliding direction is within a plane tilted by at least 60° with respect to said axis.

3. The damping and dissipation device of dynamic disturbances according to claim 2, wherein said sliding direction is within an orthogonal plane with respect to said axis.

4. The damping and dissipation device of dynamic disturbances according to claim 1, wherein said at least one of said two end elements connected to the device through the sliding coupling is a sliding block including a slide which runs on a sliding guide having a first side arranged orthogonally to said axis and a second side whose inclination with respect to the first side creates an inclination of said plane with respect to said axis.

5. The damping and dissipation device of dynamic disturbances according to claim 4, wherein said second side of said sliding guide is conformed so as to form a linear sliding guide for said slide.

6. The damping and dissipation device of dynamic disturbances according to claim 5, wherein said second side of said sliding guide has at least one cavity in which at least one complementary portion situated on a first side of said slide, slides.

7. The damping and dissipation device of dynamic disturbances according to claim 6, wherein said sliding guide is made of a material having a low friction coefficient and said slide is made of a material having a high friction coefficient, said at least one complementary portion situated on said first side of said slide being coated with a lamina made of a material having a low friction coefficient.

8. The damping and dissipation device of dynamic disturbances according to claim 4, wherein said slide includes comprises a rest surface to couple a first of said two bodies, said rest surface being coated with gripping paint.

9. The damping and dissipation device of dynamic disturbances according to claim 4, further comprising a run-limit device of said slide including at least one loop situated in said sliding guide in which at least one pin integral with said slide is constrained to slide.

10. The damping and dissipation device of dynamic disturbances according to claim 1, wherein said at least one disk and at least one elastic element with a variable load are interposed between two containment plates each provided with a leg, a first leg of a first of the two containment plates crossing a second leg of a second of the two containment plates and sliding with respect to said second leg, said first and second legs being clamped in a reciprocal fixed position.

11. The damping and dissipation device of dynamic disturbances according to claim 10, wherein at a free end of said first and second legs there is a release nut of the reciprocal tightening between said first and second legs.

12. The damping and dissipation device of dynamic disturbances according to claim 11, wherein said nut is conformed as a ferrule having an internal threading which cooperates with a free end of said first leg, said free end of said first leg having an external complementary threading.

13. The damping and dissipation device of dynamic disturbances according to claim 12, wherein said ferrule that regulates a reciprocal distance of said two containment plates has a gripping device both in the front and laterally configured to cooperate with a respective piloting instrument of rotation of said ferrule.

14. The damping and dissipation device of dynamic disturbances according to claim 13, wherein an upper gripper of the gripping device is a plurality of cavities and a side gripper of the gripping device is a plurality of grooves.

15. The damping and dissipation device of dynamic disturbances according to claim 11, wherein said release nut is housed in a hollow cylindrical body connected below to said second of the two containment plates and equipped with at least an access window.

16. The damping and dissipation device of dynamic disturbances according to claim 15, wherein said hollow cylindrical body is partially closed above by a coupling plate to one of said two bodies, said coupling plate having a central hole to maintain an axial access to said nut.

17. The damping and dissipation device of dynamic disturbances according to claim 1, wherein a protection sheath is interposed between said at least one disk made of the elastomeric material and said at least one elastic element with the variable load.

* * * * *